Feb. 18, 1969  V. E. NELSON  3,428,333
TOW-TYPE SECTIONAL AUTOMATICALLY FOLDABLE HARROW CART
Original Filed April 26, 1966  Sheet 1 of 2
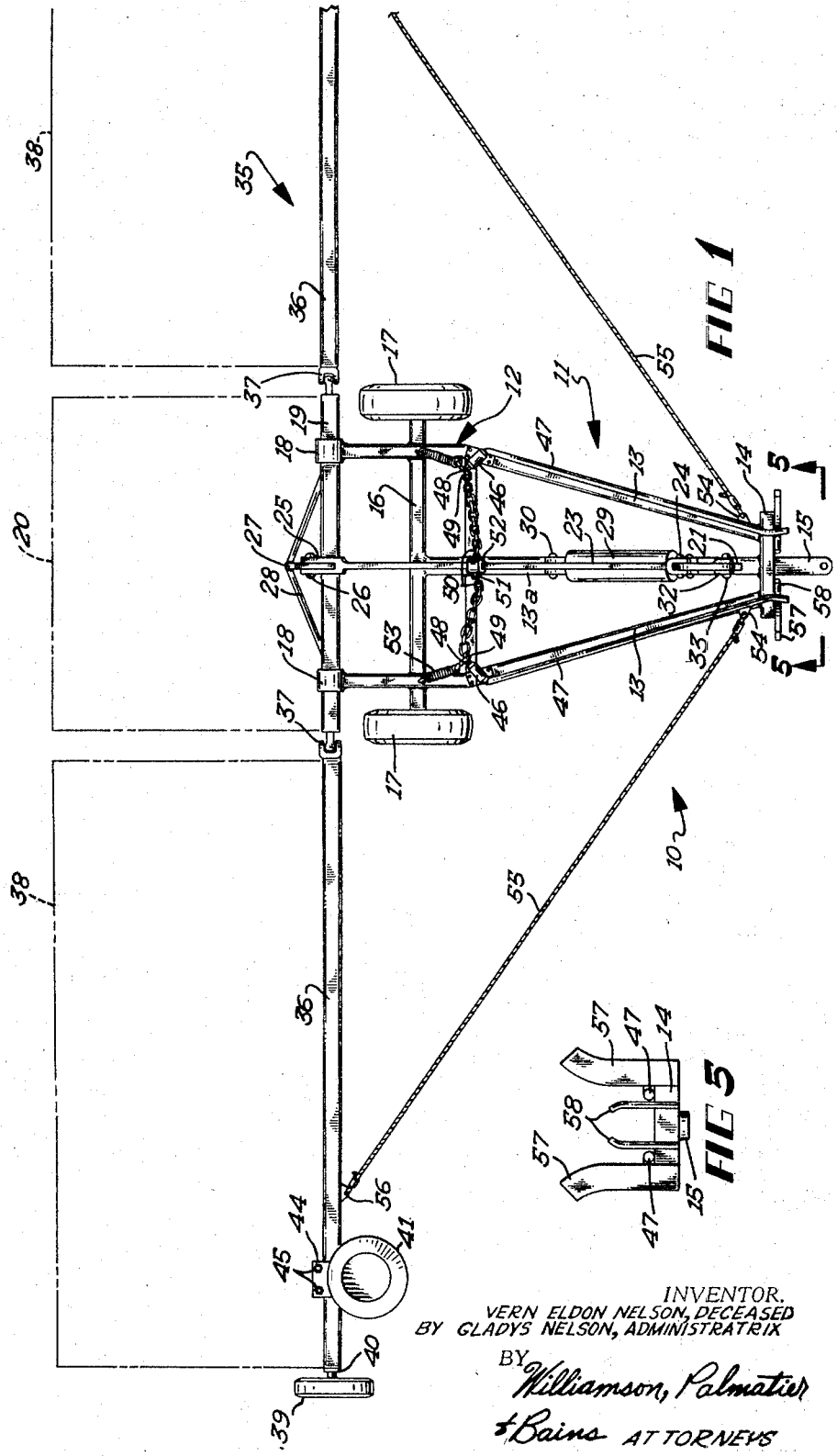
INVENTOR.
VERN ELDON NELSON, DECEASED
BY GLADYS NELSON, ADMINISTRATRIX
BY Williamson, Palmatier
& Bains ATTORNEYS

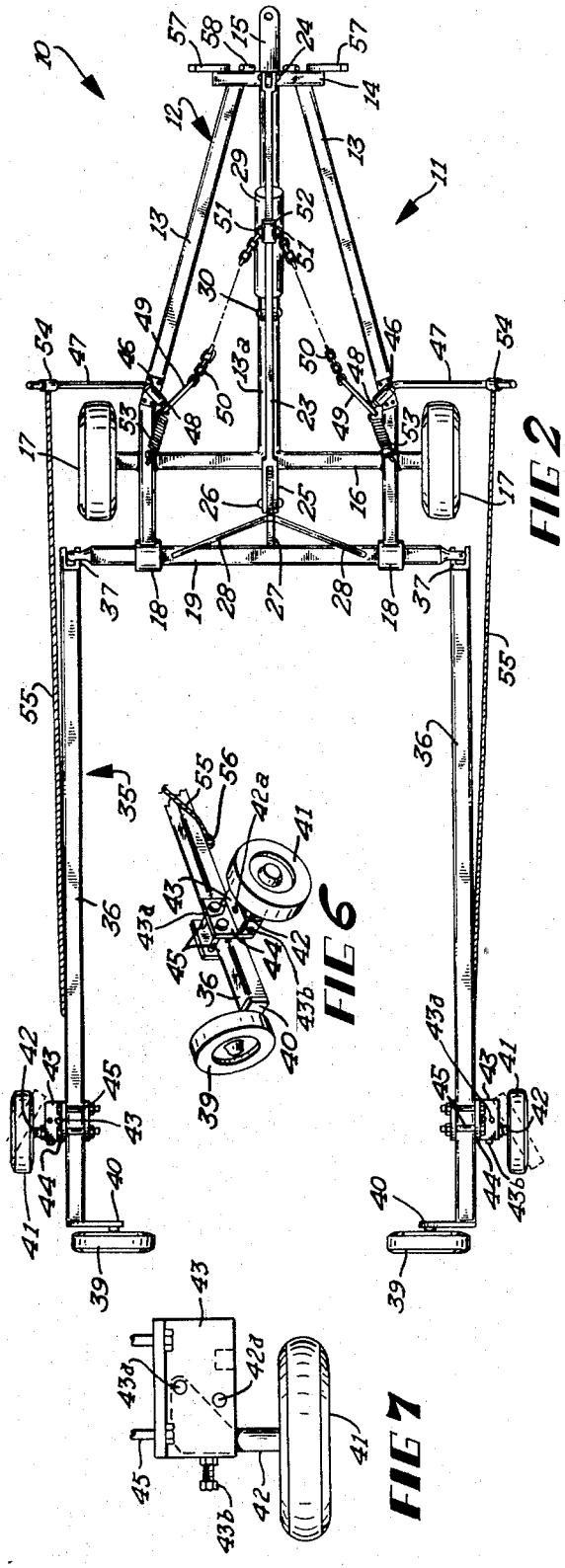

United States Patent Office 3,428,333
Patented Feb. 18, 1969

3,428,333
TOW-TYPE SECTIONAL AUTOMATICALLY FOLDABLE HARROW CART
Vern Eldon Nelson, deceased, late of Clinton, Minn., by Gladys Nelson, administratrix, Clinton, Minn. 56225
Continuation of application Ser. No. 545,492, Apr. 26, 1966. This application Nov. 24, 1967, Ser. No. 691,064
U.S. Cl. 280—411                                      9 Claims
Int. Cl. B60d, B62d 53/00, 21/14

ABSTRACT OF THE DISCLOSURE

A foldable sectional tow-type implement, including a wheel cart having a centrally located drawbar revolvably mounted thereon, and a pair of outboard sections interconnected to the centrally located drawbar and each being revolvable with the drawbar and swingable in a fore and aft direction relative thereto. Each of the drawbars serving to support an earthworking implement so that when the drawbars are in an operative position, the earthworking implements engage the surface of the ground and when the drawbars are swung to an inoperative position, the associated earthworking implements are raised. Each outboard drawbar having a pair of wheels thereon, one of which supports the associated outboard drawbar for travel when the latter is in the lowered operative position and the other wheel facilitating movement of the outboard drawbar in a fore and aft direction between a folded and extended position.

---

This is a continuation application of my copending application, Ser. No. 545,492, filed Apr. 26, 1966, now abandoned.

Although some prior art attempts have been made to permit an operator to shift the various sections between operative and transport positions without dismounting, such prior art devices are bulky including a number of specialized parts and elements, and are quite expensive.

It is therefore a general object of this invention to provide a foldable towed type sectional movable implement, of simple and inexpensive construction, including a wheeled cart having a pair of outboard draw bars mounted thereon which are readily shiftable between an extended lowered operative position and a folded raised transport position without requiring the operator to dismount from the tractor.

A more specific object of this invention is to provide a novel and improved foldable, sectional towed type implement including a wheeled cart having a centered drawbar revolvably mounted thereon for movement between a lowered operative position and a raised transport position, and a pair of outboard sections interconnected to the center drawbar and each being vertically swingable and foldable in a fore and aft direction between a lowered operative position and a folded transport position, and each having a pair of wheels thereon, one of which supports the associated section for travel when the latter is in the lowered operative position and the other wheel facilitating movement of the sections in a fore and aft direction between the folded and extended position.

A further object of this invention is to provide a novel foldable mobile implement of the class described including a novel control mechanism which cooperates with the ground engaging transport wheels for facilitating movement of the respective outboard sections between the operative and inoperative sections.

These and other objects and advantages of this invention will more fully appear from the following description made in connection with the accompanying drawings wherein like reference characters refer to the same or similar parts throughout the several views, and in which:

FIG. 1 is a top plan view of the mobile implement in the extended operative position.

FIG. 2 is a top plan view of the implement in the folded elevated transport position.

FIG. 3 is a side elevational view foreshortened for clarity with the implement in the folded, raised transport position.

FIG. 4 is a fragmentary side elevational view illustrating the control mechanism when the implement is in the lowered extended operative position.

FIG. 5 is a cross-sectional view on an enlarged scale taken approximately along line 5—5 of FIG. 1 and looking in the direction of the arrows.

FIG. 6 is a fragmentary plan elevational view of one of the transport wheels with certain parts broken away for clarity.

FIG. 7 is a top plan view of the transport wheel and mounting means therefore on an enlarged scale illustrating details of construction thereof.

Referring now to the drawings, it will be seen that one embodiment of my novel towed type foldable sectional implement, designated generally by the reference numeral 10, is there shown. The implement 10 includes a fore and aft extending wheel cart 11. The cart 11 is comprised of a cart frame including a pair of fore and aft extending frame members 13 that coverage forwardly, and are rigidly interconnected at their forward end by front transverse frame member 14 to which a hitch 15 is connected. The rear end portion of the longitudinal frame elements 13 are interconnected by the axle housing 16 that houses the axle of the ground engaging wheels 17. A central frame element 13a which is positioned between frame members 13 has opposite ends thereof rigidly connected with the axle housing and frame 14a.

A pair of sleeve type bearing elements 18 are each rigidly carried by the rear end of one of the longitudinal frame elements 13 and these bearing elements revolvably support an elongate transversely extending center drawbar 19 of a center section. This center section includes a plurality of laterally spaced apart elongate tool bars each tool bar having a plurality of earth engaging tools secured thereto. Such tools may include spike-tooth harrows, tine tooth harrows or rotary hoes or the like. This center drawbar 19 is actually revolvable through an arc of approximately 90° between a lowered operative position as illustrated in FIGS. 1 and 4, to an elevated inoperative position as best seen in FIGS. 2 and 3. It will be noted that when the drawbar 19 is in the lowered operative position, the center section carried thereby wil be in a horizontal position so that the tools carried thereby will engage the surface of the earth. Similarly, when the drawbar 19 is in the elevated transport position, the center section will be disposed in an upright position.

Means are provided for revolving the center drawbar 19 about its longitudinal axis between an operative and inoperative position and this means comprises a linkage which includes an actuating lever which is pivotally mounted on the center longitudinal frame element 13a adjacent the forward end thereof by pivot 22 for fore and aft swinging movement about a substantially horizontal transverse axis. The upper end of the actuating lever 21 is pivotally connected to the forward end of a motion transmitting link 23, by pivot 24. The rear end of the motion transmitting link 23 is bifurcated as at 25 and is pivotally connected by the pivot 26 to an arm 27 which is fixed to the central portion of the center drawbar 19.

A pair of reinforcing strips or braces 28 extend diagonally from opposite sides of the arm 27 and are attached to the center drawbar 19. Means are provided for power shifting this linkage and this means includes a fluid pressure piston and cylinder unit comprising a cylinder 29 which is pivotally connected at one end to the center frame element 13a by pivot 30 to premit pivoting movement therebetween about a substantially horizontal transverse axis. The cylinder 29 has a piston movable therein which is connected to a piston rod 31 that projects exteriorly therefrom. The piston rod extends forwardly and has a bifurcated end 32 that is pivotally connected to the median portion of the actuating lever 21 by pivot 33. This hydraulic unit is of the double acting type and a pair of conduits 34 are connected in communicating relation to opposite end portions of the cylinder 29 and are connected to a source of fluid under pressure with appropriate valve controls to permit selective extension and retraction of the piston rod. The controls for operating the hydraulic system are located on the tractor as is conventional, and it will be seen that the center section may be effectively revolved between the operative and inoperative position.

A pair of similar elongate outboard sections are each connected to one end of the center section and each outboard section includes an outboard drawbar 35. The means which interconnects the center drawbar and the outboard drawbars are universal joints 37 which permits a universal action between the interconnected drawbars. It will therefore be seen that the outboard drawbars 35 are capable of floating action when in the lowered operative position.

It is pointed out that the tool frame of outboard sections indicated by phantom line configuration may be of conventional construction and adapted to carry a plurality of earth working tools, such as spike-tooth harrows, tine-tooth harrows, rotary hoes and the like.

These outboard sections are shiftable between an operative extended lowered position as shown in FIGS. 1 and 4 and an inoperative folded elevated transport position as illustrated in FIGS. 2 and 3. It will be noted that when the outboard sections 35 are in the operative position, the drawbars 35 thereof are co-extensive with the drawbar 19. The outboard drawbars are also revolvable with the central drawbar 19 so that the respective tool frames carried thereby will be raised and lowered as the drawbars 35 are selectively revolved.

When the outboard sections are in the lowered operative position, the outer most end of each section is supported by a ground engaging wheel 39, which has its stub axle journalled in an arm 40 that is affixed to the outer end of one of the drawbars 35 and projects rearwardly therefrom when the associated drawbar is in the operative extended position. It will therefore be seen that the inner end of each drawbar 35 is supported by its universal connection with the center drawbar 19, and is supported at its outer end by the ground engaging wheel 39.

This ground engaging wheel 39, however, is shifted out of engaging relation with respect to the surface of the ground when the associated drawbar 35 is revolved to the inoperative position, and the outer end of each outboard drawbar is provided with a transport wheel 41, which as shown engages the surface of the ground when the associated drawbar 35 is in the transport position. However, this transport wheel is disposed out of engagement with respect to the surface of the ground when the associated drawbar is in the operative extended position.

The transport wheel 41 is provided with a stub shaft 42, which as seen when the transport wheel is in the lowered position as shown in FIG. 6, extends rearwardly and is received within a bearing 43 of generally rectangular cross-sectional configuration and is pivotal relative thereto by means of a pivot pin 43a. It will therefore be seen that the transport wheel 41 when in the lowered position as illustrated in FIGS. 2, 3 and 6, is capable of a limited pivotal movement about a vertical axis defined by the pivot pin 43a, pivoting movement of the wheel being limited by engagement of the stub shaft 42 with the bearing 43. A pair of bracket plates 44 apertured to receive the nut and bolt assemblies 45 therethrough, serve as means for adjustably but detachably mounting the transport wheel 41 on the associated outboard drawbar 36. To this end, it is pointed out that one of the bracket plates 44 is rigidly secured to the bearing 43 and engages the front surface of the associated outboard drawbar 36 while the other plate shown engages a rear surface of the outboard drawbar. Thus, each of the transport wheels may be mounted at any selected point along the associated outboard drawbar or alternatively may be removed therefrom if desired.

The transport wheel when swung from its elevated to its lowered position as illustrated in FIG. 6, will be disposed forwardly of the associated outboard drawbar and have its axis of rotation disposed generally normal to the longitudinal axis of the outboard drawbar. However, upon forward movement of the implement, the transport wheel will swing about its vertical pivot and move to a toed in position and thereby permit the associated drawbar to be swung to its rear transport position.

Means are also provided which cooperate with the actuating linkage interconnected to the center drawbar and to cooperate therewith for shifting the outboard sections between the operative and transport positions. To this end, it will be seen that a pair of sleeve bearings 46 are each mounted on the longitudinal frame elements 13 intermediate the ends thereof, so that the bores or openings through the sleeve bearings extend obliquely with respect to the path of travel of the implement 10. The angularly offset end portions 48 of a pair of elongate actuating rods 47 are each positioned within one of the sleeve bearings 46, whereby the rods are swingable between a lower position as illustrated in FIGS. 1 and 4 and an elevated position as illustrated in FIGS. 2 and 3. It will be noted that when the outboard sections are in the lowered operative position, the actuating rods 47 will have swung forwardly and downwardly to this lowered position. The actuating rods swing upwardly and outwardly to the raised position as the outboard sections are folded rearwardly to the transport position.

The free or inner end of the offset portion 48 of each actuating rod 47 has a short inwardly projecting arm 49 rigidly affixed thereto for movement therewith. The free end of each arm 49 is connected to one end of a flexible chain 50, the forward end of each chain 50 being secured to an eye 51 carried by a sleeve type bracket 52 which is mounted on the motion transmitting link 23 intermediate the ends thereof for sliding movement relative thereto.

The sleeve bracket 52 has a small strap 51a secured thereto and depending therefrom, this strap having an opening therethrough adjacent the lower end thereof. An elongate rod 52b projects through the opening in the strap 51a and has its ends affixed to longitudinal spaced apart angle brackets 52c rigidly affixed in spaced apart relation along the motion transmitting link 23. An elongate spring 52d is positioned around the rod 52b and has one end bearing against the rearmost bracket 52c and the other end bearing against the strap 51a. It will therefore be seen that rearward sliding movement of the sleeve bracket around the motion transmitting link is yieldably resisted by the spring 52b, the latter normally urging the strap and sleeve bracket to its forwardmost position. Thus, it will be seen, that the movement of the motion transmitting link 23 will also result in movement of the actuating rods 47.

It will also be seen that the offset portion 48 of each actuating rod 47 is also connected to one end of a helical spring 53, the other end of each helical spring being secured to the adjacent longitudinal frame element 12 adjacent the rear portion thereof. Each of the helical springs 23 will be in a substantially untensioned condition when the actuating rod is either in the lowered position as illustrated in FIGS. 1 and 4 or in the elevated position as illustrated in FIGS. 2 and 3. However, when the actuating rod is moved between these respective positions, the spring will be progressively tensioned until the rod passes a central position so that an over center effect takes place. Thus the spring 53 not only imparts a snap-like action in the movement of the associated actuating rod from either the forward lowered position or the rearward raised position, but also serves to yieldably retain the rod 47 in one of these selected positions.

Each of the actuating rods 47 has a sleeve bracket 54 secured thereto adjacent the outer end thereof and each sleeve bracket 54 has an eyelet which is connected to one end of an elongate flexible cable 55, the opposite end of each cable 55 being connected to a U-bolt or eyelet 56 secured to one of the drawbars 35 adjacent their respective outer ends thereof. It will be noted that the flexible cables 55 extend diagonally outwardly and rearwardly when the outboard sections are in the lowered operative position but extend substantially rearwardly and downwardly when the outboard section is in the transport position.

Referring now to FIGS. 1 and 5 it will be seen that a pair of vertically disposed exterior guide elements 57 are rigidly secured to the transverse frame element 14 of the cart frame 12, the upper ends of these outer guide elements curving outwardly. Similarly, a pair of vertical inner guide elements 58 are also rigidly secured to the transverse frame element 14 and project upwardly therefrom. It will be noted, that the upper ends of the inner or interior guide elements 58 curve inwardly towards each other as best seen in FIG. 5. It will be seen, that each pair of inner and outer guide elements serves to guide and seat the forward end portions of one of the actuating rods 47 therebetween when the actuating rods are moved to the lowered position wherein the actuating rods are actually supported by the cart frame 12. It will also be noted that the attachment of the cables 55 to the associated rod is located rearwardly of the guide elements when the rods are in the lowered position.

During operation of the implement, the hitch 15 will be connected to a prime mover such as a tractor, and the implement will be towed therebehind. If it is assumed that the implement is in the operative position, the piston rod 31 will be retracted so that the actuating lever 21 is disposed in the position illustrated in FIG. 4. The drawbars 35 will be coextensive and coaxial with the center drawbar 19 and the respective tool frames will be in a horizontal position so that the tools carried thereby will engage the earth to be worked. In this position, the outer end portions of the outboard sections will be supported for travel by the ground engaging wheels 39 and the universal joint between the outboard drawbars 35 and the center drawbar permits a floating action to take place therebetween to accommodate irregularities in the terrain.

When it is desirable to shift the implement to the transport position, the operator of the tractor will actuate the controls located on the tractor whereby the piston rod 31 will be extended to the position illustrated in FIGS. 2 and 3 to shift the actuating lever 21 in a forward vertical direction. This movement is transmitted through the motion transmitting link 23 to the center drawbar 19 to rotate the latter and to also produce revolving movement in a forward direction with respect to the outboard drawbars 35. Rotation of the drawbars in this direction elevates the tool frame associated with the center drawbar and also elevates the tool frames associated with the outboard drawbars. The transport wheel 41 will be rotated from its raised position to a ground engaging position while the ground engaging wheel 39 will be moved out of engaging relation with respect to the ground.

When the motion transmitting link 23 is shifted in a forward direction, this motion is also transmitted through the chains 50 to the actuating rods 47. These actuating rods will be swung against the bias of the springs 53 from their lowered position to their elevated position. These rods will be snapped to the rearward position in an over center action just prior to engagement of the transport wheel 41 with the surface of the ground. The cables 55 will therefore be in an untensioned condition to permit swinging movement of the outboard sections to the rearward folded position upon forward movement of the tractor or prime mover.

To this end, it is pointed out that transport wheels 41 are capable of limited pivotal movement about their respective vertical pins 43a so that the wheels 41 will toe in slightly when in the extended position. Each transport wheel may be provided with a suitable locking pin 42a which interlocks each wheel shaft 42 against movement with respect to the mounting bracket 43 associated therewith so that the transport wheels are arranged in a forwardly towed in position. Each wheel mounting bracket is also provided with an adjustment screw 43b which permits adjustment of the amount of swinging movement of the associated transport wheel 41. Therefore, when the tractor is moved forwardly, the outboard sections will immediately swing rearwardly into the position illustrated in FIGS. 2 and 3 wherein the outboard sections are disposed in substantially parallel relation. The respective tool frame of the outboard sections as well as the center tool frame will be retained in an elevated position and the implement is then in condition for transport.

When it is desirable to shift the implement into the operative lowered position, it is merely necessary for the operator to drive the tractor rearwardly whereby the transport wheels will shift the outboard sections to the extended position and to actuate the hydraulic cylinder unit to retract the piston rod thereof so that the center drawbar and outboard drawbars are revolved to allow the tool frames to be lowered. During this movement, the actuating rods are then shifted to their forward lowered position and the cables 55 will be maintained in a substantially taut condition. As pointed out above bracket 43 has a threaded aperture therein which receives the threaded adjusting set screw 43b, as best seen in FIG. 7. This set screw 43b projects into the interior of the bracket 43 and engages the stub shaft 42 of the associated transport wheel 41 to limit the amount of swinging movement of the stub shaft about its vertical pivot.

From the foregoing description it will be seen that the operator may readily shift the foldable section or implement between operative and transport positions without being required to dismount from the tractor.

It will also be seen from the preceding paragraphs that the foldable sectional agricultural implement is not only of simple and inexpensive construction but one which functions in a more efficient way than any heretofore known comparable implement.

It will, of course, be understood that various changes may be made in the form, details, arrangement and proportions of the various parts without departing from the scope of this invention.

What is claimed is:

1. A mobile foldable sectional earth working implement comprising a mobile cart having a pair of ground engaging wheels to support the same for travel over the surface of the ground, hitch means on said cart for releasable connection to a prime mover, an elongate center drawbar revolvably mounted on said cart and extending transversely of the direction of travel and being revolvable about an axis transversely of the direction of travel for movement between an operative and an inoperative position, said drawbar having a tool frame carried thereby for movement therewith, a pair of elongate outboard drawbars each having a tool frame carried thereby, means pivotally connecting one end of each of said outboard drawbars with one end of said center drawbar for pivotal movement therebetween and for revolving movement with said central drawbar between an operatve and an inoperative position, said drawbars when disposed in said operative position orienting the tool frames carried thereby in substantially horizontal relation and when in inoperative position being revolved through a predetermined arc to position the tool frames in a substantially vertical position, said outboard drawbars when in said inoperative position being capable of fore and aft swinging pivotal movement about a substantially vertical axis between an extended substantially axially aligned position and a rearwardly folded transport position, operating means extending between and interconnected with said center drawbar and said cart and being shiftable to revolve the center drawbar between its operative and inoperative positions, power means on said cart frame for shifting said operating means, retaining means interconnecting the outboard drawbars with said operating means and being operable upon shifting of said operating means in a direction to cause said drawbars to move to said vertical inoperative position to permit rearward swinging movement of the outboard sections to a transport position, and being operable when said operating means is shifted in the opposite direction to cause said drawbars to move to said horizontal operative position to maintain said outboard sections in an extended position wherein said drawbars are disposed in substantially aligned relation, a pair of ground engaging wheel means each being connected to the outer end of one of said outboard drawbars and supporting the outboard sections for travel over the surface of the ground when the latter are disposed in substantially aligned position, said ground engaging wheel means being effective when the associated outboard drawbar is revolved to an inoperative position, to guide rearward folding pivoting movement of the associated outboard section to the transport position upon forward movement of said implement, and to carry the associated section to swing forwardly to the extended position upon rearward movement of the implement.

2. The implement as defined in claim 1, wherein said wheel means includes a pair of ground engaging wheels, each being connected to the outer end of one of said outboard drawbars and supporting the outboard sections for travel over the surface of the ground when the latter are disposed in the operative position, a pair of transport wheels, each being mounted on one of said outboard drawbars adjacent the outer end thereof and each being disposed out of engaging relation with respect to the surface of the ground when the associated drawbar is in the operative position, and being disposed in engaging relation with repect to the surface of the ground when the associated drawbars are in the inoperative position.

3. The implement as defined in claim 1, wherein said retaining means includes a pair of elongate, flexible members, each having one end thereof connected with one of said outboard drawbars, and means interconnecting the respective other ends of said flexible members with said operating means.

4. The implement as defined in claim 1, wherein said operating means includes an elongate motion-transmitting link having one end thereof interconnected with said center drawbar, means pivotally connecting the other end of said link with said cart and with said power means.

5. The implement as defined in claim 4, and a pair of elongate actuating members shiftably mounted on said cart, each being connected with said other end of one of said flexible members, means interconnecting said actuating members with said motion-transmitting link.

6. The implement as defined in claim 2, wherein each of said transport wheels includes mounting means for releasable and adjustable mounting thereof to the associated outboard drawbar whereby each transport wheel may be adjustably mounted at a selected spaced point along the associated drawbar.

7. The implement as defined in claim 6, wherein each of said transport wheels includes a stub shaft, and said mounting means for each transport wheel includes shaft receiving means receiving the stub shaft of the associated wheel therein, pivotal means mounting each stub shaft for each transport wheel in its associated shaft receiving means to permit limited swinging movement of the stub shaft about a substantially vertical axis when the transport wheel is in the lowered position.

8. The implement as defined in claim 1, wherein said operating means includes an elongate motion-transmitting link having one end thereof interconnected with said center drawbar and having the other end thereof connecting with an actuating lever, the lattter being pivotally mounted on said cart, and means interconnecting said retaining means with said motion-transmitting link.

9. The implement as defined in claim 8, wherein said retaining means includes a pair of elongate, flexible members, each having one end thereof connected with one of said outboard drawbars, and each having its other end thereof connected with said interconnecting means, the latter including a pair of elongate rods, each being mounted adjacent one end thereof on said cart for fore and aft winging movement relative thereto, and a pair of elongate, flexible element interconnecting said rods with said motion-transmitting link.

References Cited

UNITED STATES PATENTS

| | | |
|---|---|---|
| 2,828,597 | 4/1958 | Moore. |
| 2,944,615 | 7/1960 | Clark. |
| 2,973,818 | 3/1961 | Marvin. |
| 2,974,737 | 3/1961 | Dlugosch. |
| 3,091,296 | 4/1963 | Lohrman et al. |
| 3,162,494 | 12/1964 | Marmorine et al. |
| 3,169,027 | 2/1965 | Oerman. |
| 3,173,497 | 3/1965 | French. |

LEO FRIAGLIA, *Primary Examiner.*

U.S. Cl. X.R.

280—34; 172—456